Dec. 13, 1966  J. H. ANDERSON  3,291,005
REINFORCED FLEXIBLE DIAPHRAGM
Filed April 21, 1964  3 Sheets-Sheet 1

INVENTOR
JAMES H. ANDERSON

BY *Kenon, Palmer, Stewart & Estabrook*
ATTORNEYS

INVENTOR
JAMES H. ANDERSON

ATTORNEYS

Dec. 13, 1966  J. H. ANDERSON  3,291,005
REINFORCED FLEXIBLE DIAPHRAGM
Filed April 21, 1964  3 Sheets-Sheet 3

INVENTOR
JAMES H. ANDERSON

BY Kenyon, Palmer, Stewart & Estabrook
ATTORNEYS

United States Patent Office

3,291,005
Patented Dec. 13, 1966

3,291,005
REINFORCED FLEXIBLE DIAPHRAGM
James H. Anderson, 1615 Hillock Lane, York, Pa.
Filed Apr. 21, 1964, Ser. No. 361,462
14 Claims. (Cl. 92—100)

This invention relates broadly to diaphragms and particularly to a new and improved sealing diaphragm having great strength capability, high sensitivity to pressure variation and low thermal conductivity.

In present day usage the pressure capability of a diaphragm generally increases with increasing thickness while the pressure sensitivity thereof generally decreases with increasing thickness. This tends to limit the sensitivity of high pressure capability diaphragms since the thickness required to withstand the high pressures imposed thereon necessarily restricts its sensitivity. Also, in present day diaphragms, the pressure sensitivity, for a given diaphragm thickness, is directly proportional to the diaphragm span while the pressure capability of the diaphragm is inversely proportional thereto. Thus, diaphragms as exemplified by the prior art are not, in all cases, adaptable to situations requiring a large span diaphragm of high pressure capability while having a high degree of sensitivity to pressure variation.

It has also been ascertained that diaphragms, as typified by the prior art, have not proven to be entirely satisfactory in a high pressure environment that requires a low heat conductivity through the diaphragm material. Since the heat transfer rate of a diaphragm for a given material is directly proportional to the thickness of the material, the requirements of high pressure capability and low heat conductivity are not always to be found in presently available pressure diaphragms. In some situations, it is desirable to have a diaphragm which has a high resistance to failure in one direction yet is sufficiently weak in the opposite direction so that it will either fail or exhibit a different property under the influence of a reversed pressure. The selective directional strength capability required in these cases is generally not found in diaphragms of the prior art design.

There is furthermore a requirement in the pump and actuator art for diaphragms which can with stand high pressures yet possess a large deformation capability. These qualities are also incompatible in prior art diaphragms since the thicker, high pressure, diaphragm has a greater resistance to deformation than a thinner diaphragm.

It is, therefore, an object of this invention to provide a new and improved diaphragm structure which avoids the shortcomings of the prior art by employing an external strength increasing supporting structure on one or both sides of a high span versus thickness ratio diaphragm.

It is also an object of this invention to furnish a diaphragm which has both a high degree of pressure sensitivity and a high pressure capability by reinforcing a high span versus thickness ratio diaphragm with external support means.

It is a further object of this invention to provide a relatively high span versus thickness ratio diaphragm reinforced with relatively thin elongated members, thereby providing a diaphragm which has a high pressure capability and at the same time a low heat transfer rate.

It is a further object of this invention to provide a diaphragm having external reinforcing means which can be located on only one side of the diaphragm or on both sides of the diaphragm with different reinforcing strength characteristics, thereby providing a diaphragm which has a higher pressure capability in one direction than in the opposite direction.

It is still another object of this invention to provide a diaphragm for pumps, actuators or like apparatus incorporating external reinforcing means on one or both sides of the diaphragm which, through such incorporation, has high pressure capability while, at the same time, having a low resistance to deformation.

These and other objects of the invention will become better understood by reference to the following detailed description when viewed in the light of the accompanying drawings in which like numerals indicate like parts throughout the figures thereof, and wherein.

The present invention is readily adaptable for use in any instrument or device employing a diaphragm and consists of a flexible planar or corrugated element of uniform thickness having a plurality of rigid reinforcing members positioned on opposite sides thereof at the center and outer edge portions in concentric relation with one another. The part of the flexible element intermediate the inner and outer rigid members comprises the working portion of said flexible element. The inner and outer rigid members have interposed therebetween spacer members which abut the working portion of the flexible element and are arranged in a common plane normal to said flexible element. A plurality of cables or similar flexible elongated strand-like members connect the edge reinforcing members to the center reinforcing members and extend over the spacer members to hold the cables away from the face of the flexible element. The cable and spacer member arrangement forms an external reinforcing means for the flexible member in that it provides additional mechanical strength for the working portion of the flexible member in such a way that said member may be reinforced without substantially increasing the inherent sensitivity to pressure variation or the heat transfer character of the material itself.

Figure 1:
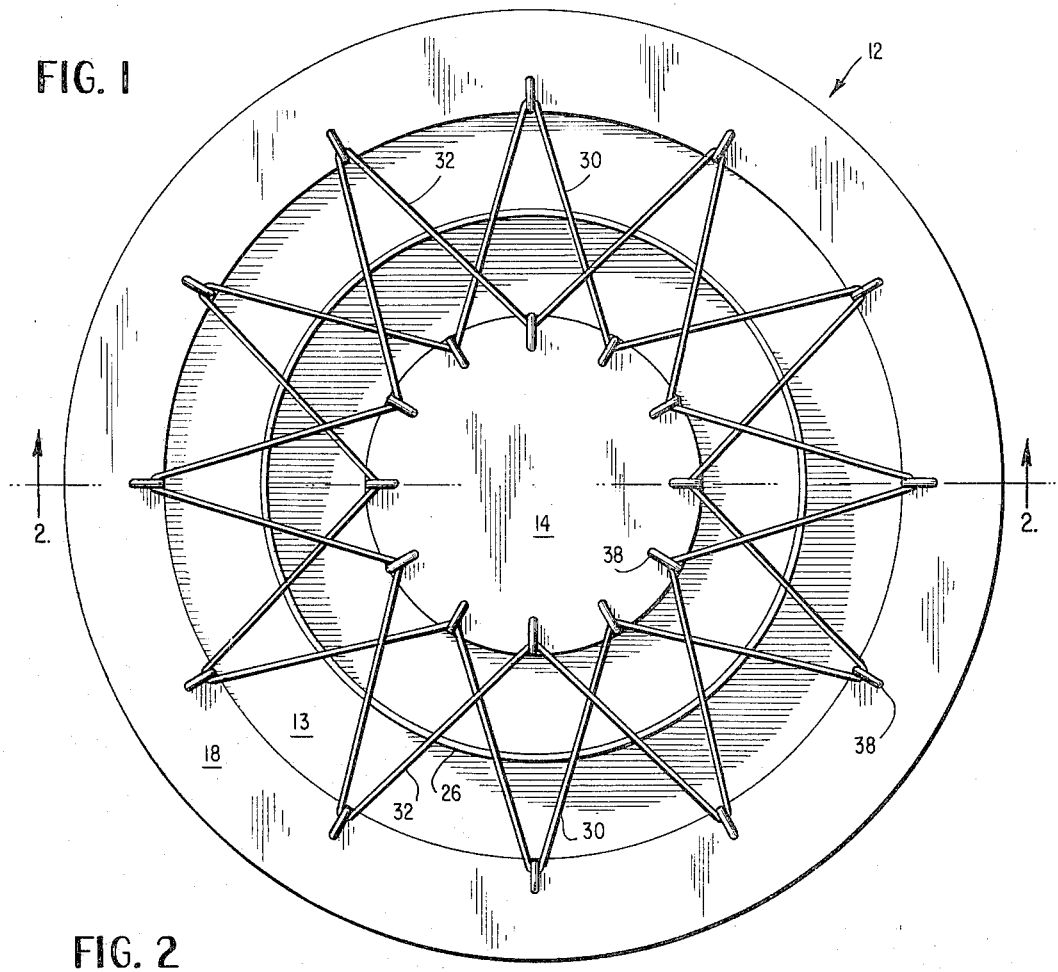
FIGURE 1 is an elevational view of a diaphragm structure embodying the features of the invention.
Figure 2:
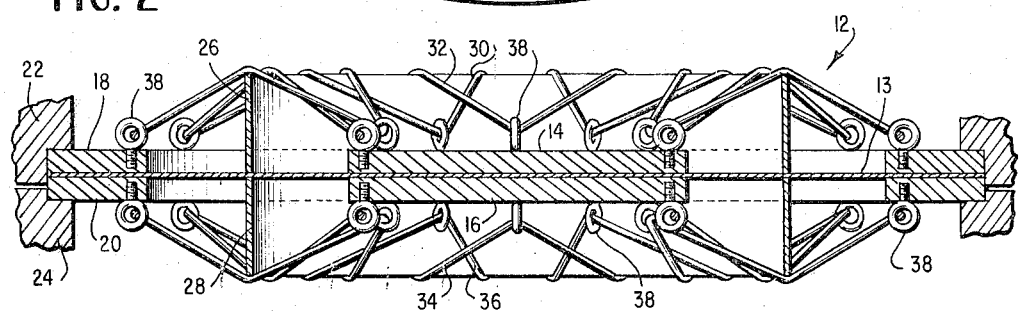
FIGURE 2 is a sectional view of the diaphragm of FIG. 1, the view being taken along the lines 2—2 thereof.

Referring to FIGS. 1 and 2, there is shown a flat diaphragm device 12 for use in a pressure measuring or pressure sealing type of operation. The device consists of a flexible diaphragm 13 mounted between a pair of rigid inner or center disc members 14 and 16 and a pair of rigid outer or annular members 18 and 20 with said members acting as reinforcing elements for the diaphragm. The diaphragm may be held in place by any suitable structure such as rings 22 and 24 which engage therebetween the outer annular members 18 and 20 for retaining said members, as well as the other components of the diaphragm, fixed in the device being sealed. The inner and outer members have interposed therebetween on opposite sides of the diaphragm 13, annular spacer members 26 and 28 which abut the diaphragm in a common cylinder normal thereto. The inner member 14 and the outer member 18 are connected to one another by a pair of flexible, continuous cables 30 and 32 which extend over the spacer member 26 and are threaded through eyelets 38 provided on the adjacent edges of the inner and outer members 14 and 18. The inner and outer members 16 and 20, respectively, are similarly connected to one another by cables 34 and 36. It is to be noted that cable 30 is fed through alternate eyelets 38 on the members 14 and 18 and continues to follow such an alternate path about said members, while cable 32, overlying portions of cable 30, is threaded through the remaining eyelets on the members 14 and 18. The cables strung in the above fashion form a generally star-like pattern over the annulus between the inner and outer members. This same pattern is followed with respect to cables 34 and 36 in connecting the inner and outer members 16 and 20. The ends of the cables may be joined by welding, braiding or any other suitable means to make a continuous loop. The pattern devised from the foregoing method of stringing the cables is described for illustration only, and any suitable pattern which would provide symmetrical support for the diaphragm would obviously be within the scope of the present invention. The cables may be formed from solid or stranded steel, aluminum or other metallic material, or from plastic or fabric or the like depending upon the environment in which the diaphragm is to be used.

In operation, the diaphragm 13, under the influence of fluid or mechanical pressure, will flex, thus causing or providing for an axial displacement of the inner members 14 and 16 with respect to the outer members 18 and 20, as well as an angular displacement of the portion of the diaphragm 13 intermediate said inner and outer members. Assuming this displacement or deflection is such as to move the inner members 14 and 16 downwardly, as viewed in FIGURE 2, tension would be induced in cables 34 and 36 due to the increase in distance between the free faces of the members 16 and 20 as well as the displacement of spacer member 28 because of the angular deflection of the diaphragm 13. This tension would thus serve to provide resistance to the deflection of the members in addition to the resistance offered by the inherent characteristics of the diaphragm 13 itself. This tension would, however, tend to elongate the cables to a certain degree and they would slide over the free outer edges of the spacer members thus allowing displacement between the member 14 and 16 while still providing mid-span support for the diaphragm 13. If pressure was applied to the diaphragm 13 in an opposite direction, then tension would be induced in the cables 30 and 32 in a similar fashion. The deformation of the cables would, of course, be a function of both the inherent properties of the cable material and the initial tension placed in the cables at the time of installation. The cables could be designed and installed to offer a minimum resistance to initial deflection and a high resistance to extreme deflection and thereby provide a high sensitivity to pressure variation for the diaphragm 13 under low pressures or deflection conditions and a high resistance to deformation under high pressures. The invention thereby provides for greater displacement of the reinforced diaphragm than would be available in an equal strength unsupported diaphragm.

If the cable system were provided only on one side of the diaphragm or if the cable systems on opposite sides of the diaphragm have different strength characteristics, then the deflection of the diaphragm towards the different sides would be resisted by different forces and therefore the diaphragm would have different sensitivity to pressure variations or strength capabilities depending on the direction of the imposition of load thereon. In this manner a diaphragm is provided which has directional strength or pressure sensitivity characteristics. The cables may be formed from a material having a low heat conductivity, thereby furnishing a low heat conductivity reinforcement for the diaphragm. The cables, even if constructed from the same material as the diaphragm, would offer less area for heat transfer and therefore would provide less thermal conductivity than the equivalent strength solid diaphragm.

The reinforced diaphragm, FIGS. 1 and 2, provides a device in which a relatively thin diaphragm member may be utilized to produce a structure which is highly sensitive to small pressure variation, yet is sufficiently strong to withstand a high degree of pressure fluctuation or high pressure variation with a high span to thickness ratio or high pressure variation with a low thermal conductivity.

Figure 3:
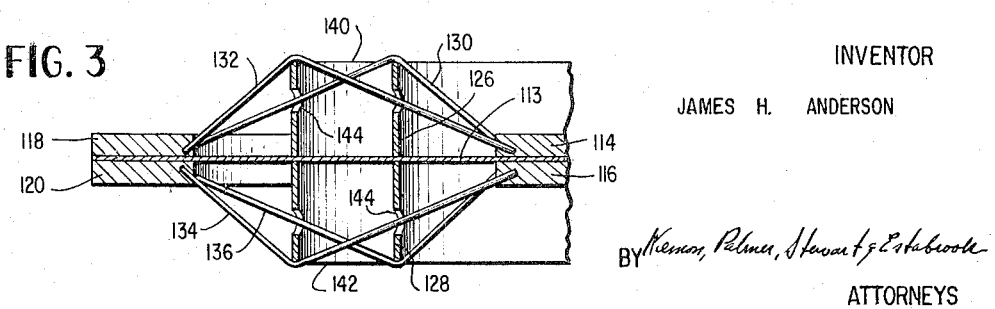
FIGURE 3 is a sectional view of a portion of the diaphragm of FIG. 2 showing a variation of the diaphragm structure.

Referring to FIG. 3 there is shown a variation of the diaphragm device of FIGS. 1 and 2 wherein corresponding parts have been identified by the same reference numeral only using the next higher series. The outer members 118 and 120 and inner disc members 114 and 116 are mounted on the diaphragm 113 and connected by cables 130 and 132, and 134 and 136, respectively, in the same manner as the diaphragm structure of FIG. 1. The outer members 118 and 120 and disc members 114 and 116 have two sets of spacer members 126 and 128, and 140 and 142 interposed therebetween in separate planes normal to the diaphragm 113 which arrangement distributes the load from the tension in the cables over the wider area of the diaphragm surface. The cables may extend over the free outer edges of both sets of spacer members, or, as shown in FIG. 3, may be routed through apertures 144 formed in the spacer members. The individual lengths of cables may be connected to the respective reinforcing members 114, 116, 118 and 120 by welding, soldering, swaging, or any other suitable method.

Figure 4:
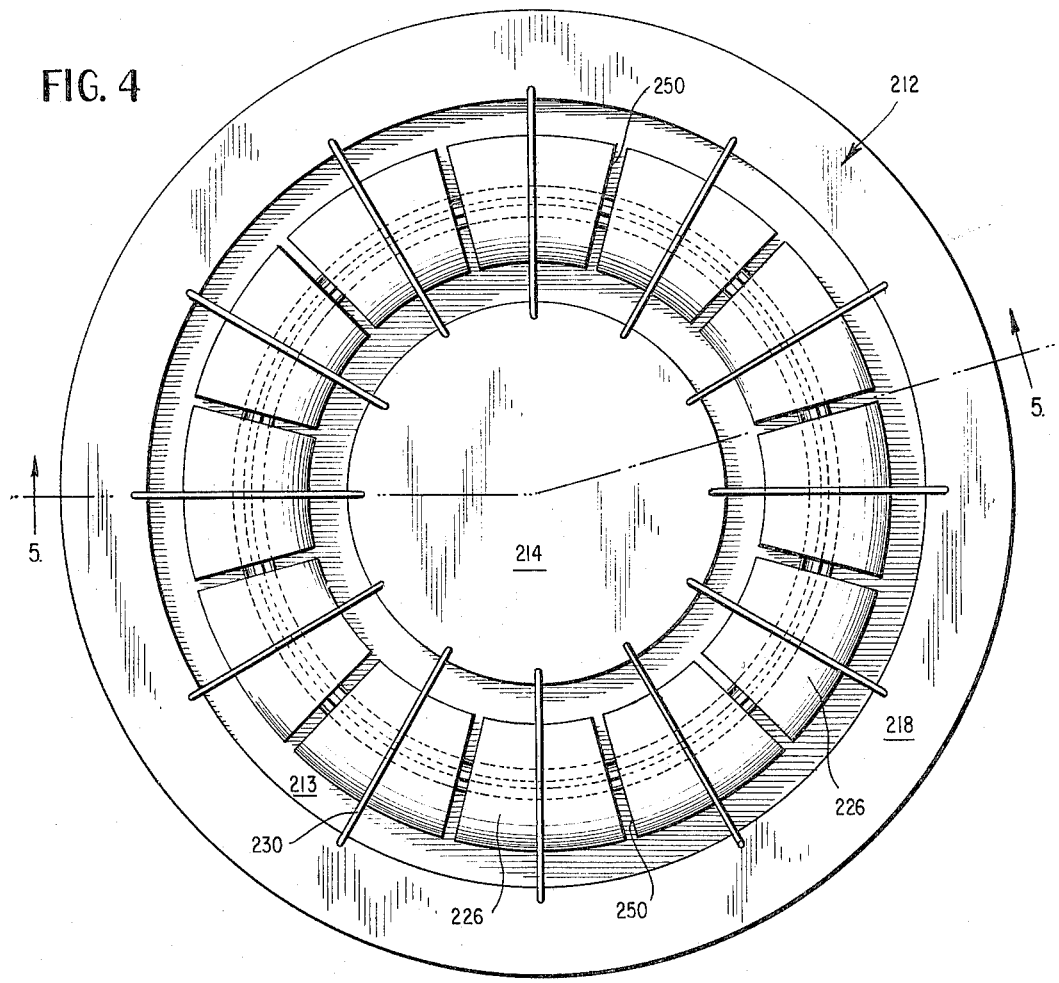
FIGURE 4 is an elevational view of another diaphragm structure embodying features in accordance with the invention.
Figure 5:
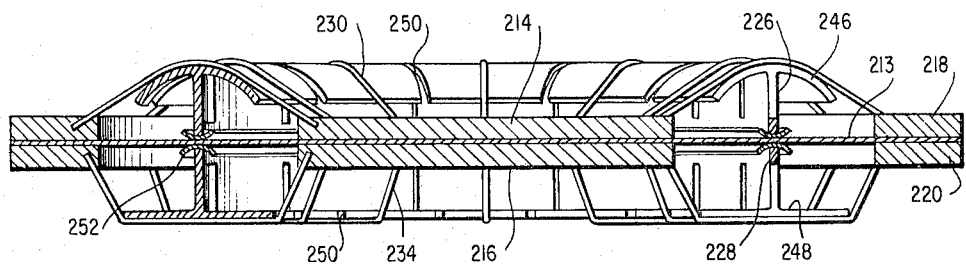
FIGURE 5 is a sectional view of the diaphragm of FIGURE 4, the view being taken along the lines 5—5 thereof.

The diaphragm device illustrated in FIGS. 4 and 5 is considered to be particularly desirable when a rather large and/or continuous deflection of the disc members 214 and 216 with respect to the outer members 218 and 220 is required. In order to avoid unusual or excess wear of the cables in their area of contact with the spacer members 226 and 228, said members are formed at their outer ends with an arcuate shaped wear plate 246 and a flat wear plate 248, respectively. These plates are preferably disposed so that the lines defining the chord length of the arcuate plate and the flat plane of the flat plate are substantially parallel to the plane of the diaphragm. These plates provide a greater contact surface between the spacer members and cables and thereby reduce the wearing force on the cables. The cable wear may be further reduced by providing for a twisting type of deflection of the spacer members in the axial plane thereof to minimize the relative motion between the spacer member and cables. This is accomplished by forming spaced slots 250 in the wear plates 246 and 248 and which slots extends into the spacer members 226 and 228 terminating a slight distance from the diaphragm 213. This arrangement tends to reduce the resistance of the spacer members to torsional bending in the axial plane and thus allows the spacer members to flex inwardly as the cables tend to be pulled thereover, thereby permitting the plate members 246 and 248 to move with the cables and reduce the relative motion and resulting wear between any members. The ends of the spacer members 226 and 228, which are in abutting contact with the diaphragm, may be formed with arcuate surfaces 252 which will further tend to make the spacer members more conducive to a flexing motion. These surfaces are also preferably disposed so that a line defining the chord length thereof is substantially parallel to the diaphragm surface. The arcuate surfaces 252 also tend to prevent or minimize damage to the diaphragm from the flexing motion of the spacer members at their points of contact therewith.

The cross-sectional configuration of the spacer members may, of course, be varied as desired, so long as it is compatible with the above-stated objectives. The configurations shown in FIGS. 4 and 5 merely illustrate two of the shapes which may be used, and it should therefore be obvious that the spacer members as illustrated, may be interchanged or substituted for one another or other configurations may be used without altering the basic concept of the invention.

Figure 6:
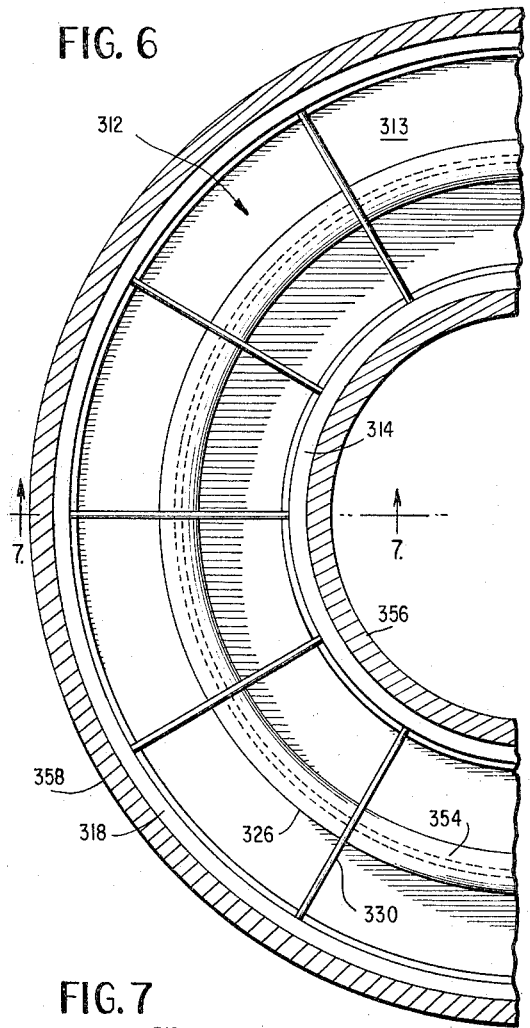
FIGURE 6 is an elevational view of a portion of still another diaphragm structure embodying features of the present invention.
Figure 7:
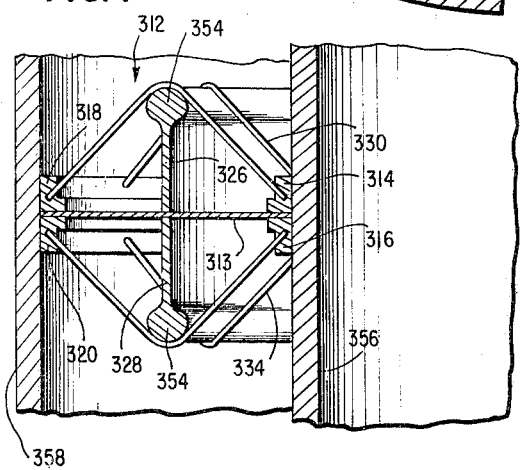
FIGURE 7 is a sectional view of the diaphragm of FIGURE 6, the view being taken along the lines 7—7 thereof.

Referring to FIGS. 6 and 7, there is shown a diaphragm device 312 interposed between two concentrically disposed tubular elements 356 and 358. The inner rigid members 314 and 316 are mounted on the outer peripheral surface of the tubular element 356 and the outer rigid members 318 and 320 are supported on the inner surface of the tubular element 358 with the diaphragm 313 interposed between and engaged by said members. In this embodiment, the non-diaphragm-abutting end of the spacer member 326 terminates in a rounded bead 354 which serves, in much the same fashion as the plates 246 and 248 of FIGURE 5, to reduce wear on the cables of the system. The cables 330 and 334 are identical to the cables 230 and 234 of FIGURE 5 and may be installed in the same manner.

Figure 6A:
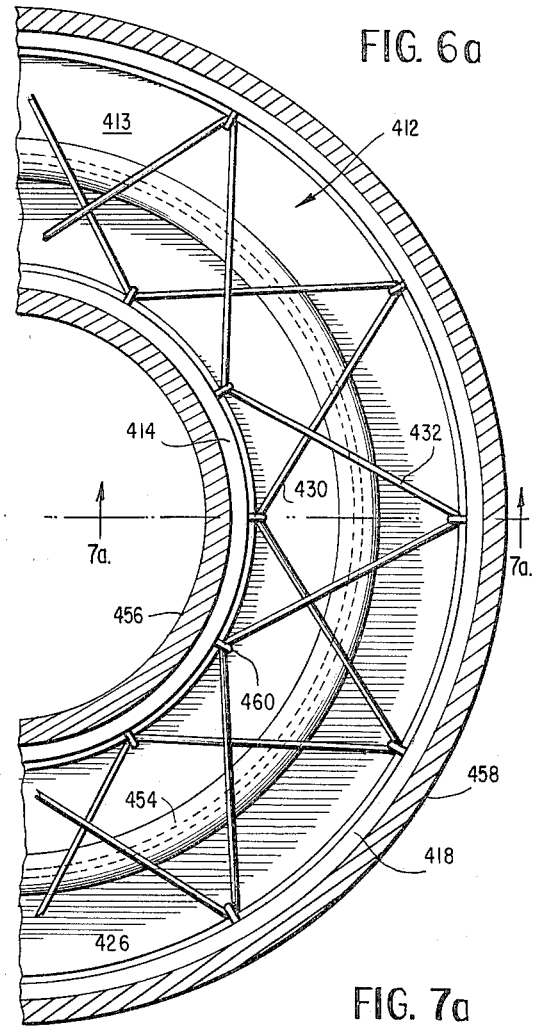
FIGURE 6a is a view similar to FIGURE 6 illustrating a variation of the diaphragm structure of FIGURE 6.
Figure 7A:
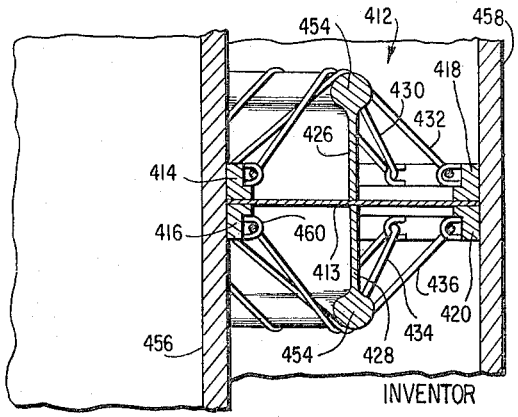
FIGURE 7a is a sectional view of the diaphragm of FIGURE 6a, the view being taken along the lines 7a—7a thereof.

The embodiment of FIGURES 6a and 7a is essentially identical to that of FIGS. 6 and 7 with the exception of of the disposition of the cables 430, 432, 434 and 436. These cables are arranged in much the same fashion as those of FIGURES 1 and 2 with the exception that the eyelets are replaced by U-shaped members 460 that are welded or otherwise affixed to the inner members 414 and 416 and the outer members 418 and 420.

As has already been pointed out, the embodiments of FIGS. 6, 7, 6a and 7a are especially adapted for use in sealing the annular space between two concentrically disposed tubular elements. This capability is particularly desirable where sealing is necessary between two coaxially disposed pipes and where some relative axial motion or requirement for low heat transfer rates between the pipes is anticipated.

The diaphragm may be of any type of material that is compatible with the environment in which it is to be used, including metal, rubber, plastic, coated fabric or the like.

The device may be used as a seal between relatively movable members, as the sensing portion of a pressure or flow measuring instrument, or be incorporated in diaphragm-type pumps or like apparatus.

The various embodiments of the basic concept of the present invention as set forth hereinabove illustrate many ways in which the invention may be incorporated into diaphragm devices that are intended for various uses or subjected to varying operational requirements. It should be obvious, therefore, that the features of any of the particular devices as set forth may readily be interchanged and still come within the basic concepts of the present invention. It should also be understood that, within the scope of the appended claims, the invention may be practiced otherwise than as specifically set forth.

What is claimed as new and desired to be protected by Letters Patent of the United States is:

1. A reinforced diaphragm comprising: a diaphragm member; an inner rigid member centrally disposed on and fixed to at least one face of said diaphragm; an outer coplanar rigid annular member fixed to said one face of said diaphragm and concentrically disposed with relation to said inner member, to define, in conjunction with said inner rigid member, an annular space therebetween; at least one axially extending annular spacing member disposed in said space in abutting relationship with said diaphragm; and a network of elongated flexible members connecting the coplanar inner and outer rigid members together and disposed in tension over said spacer member, said network being further disposed to provide tensile resistance to axial displacement of said diaphragm while providing for axial displacement between said coplanar inner and outer rigid members.

2. A reinforced flexible diaphragm for sealing the space between two coaxially disposed tubular elements comprising: a substantially flat annular diaphragm member; an annular inner rigid member centrally disposed on at least one of the flat faces of said diaphragm at the inner edge thereof; an outer annular rigid member concentrically disposed on at least one of the flat faces of said diaphragm at the outer periphery thereof to define, in conjunction with said inner rigid member, an annular space therebetween; at least one annular spacing member disposed in said space in abutting relationship with the flat faces of said diaphragm, and a network of elongated flexible members to connect the inner and outer adjacent rigid members together, said flexible members being disposed in tension over said spacer member and atttached to said rigid members proximate said diaphragm, between said adjacent inner and outer rigid members.

3. A diaphragm in accordance with claim 2 wherein said network of elongated flexible members comprises a plurality of radially disposed cables, each of said cables being individually fixed to adjacent outer and inner rigid members at the respective ends of said cables.

4. A diaphragm in accordance with claim 2 wherein said network of elongated flexible members comprises at least one continuous cable connected alternately to adjacent inner and outer rigid members at angles to the radii of said diaphragm to form a star-like pattern across said space.

5. A diaphragm in accordance with claim 2 wherein the end of said spacer member remote from the end abutting said diaphragm is provided with an enlarged bead.

6. A reinforced flexible diaphragm comprising: a substantially flat diaphragm member; rigid disc members centrally disposed on and fixed to the flat faces of said diaphragm; annular outer rigid members disposed on said diaphragm and fixed to opposite flat faces thereof in spaced concentric relation with said disc members to defiine, in conjunction with said rigid disc members, annular spaces between adjacent ones thereof; at least one axially extending annular spacer member disposed in each of said spaces in abutting relationship with said diaphragm, and a network of elongated flexible mmebers connecting adjacent disc and annular members proximate said diaphragm and disposed in tension over said spacer member, said network being further disposed to provide tensile resistance to axial displacement of said diaphragm while providing for axial displacement between said adjacent rigid members.

7. A diaphragm in accordance with claim 6 wherein said network of elongated flexible members comprises a plurality of radially disposed cables, each of said cables being individually fixed to one of said disc members and the adjacent of said outer members at the respective ends of the cables.

8. A diaphragm in accordance with claim 6 wherein said network of elongated flexible members comprises at least one continuous cable connected alternately to one of said disc members and the adjacent of said outer members at angles to the radii of said diaphragm to form a star-like pattern over said space.

9. A reinforced flexible diaphragm comprising: a substantially flat diaphragm member; rigid disc members positioned on and fixed to opposite faces of said diaphragm; annular rigid outer members positioned on and fixed to opposite faces of said diaphragm in spaced concentric relation with said disc members to define, in conjunction with said disc members, an annular space therebetween; at least one spacer member disposed in each of said spaces in abutting relationship with said diaphragm, said spacer members having a plurality of spaced slots there extending from the ends thereof farthest removed from said diaphragm to a point proximate said diaphragm; and a network of elongated flexible members connecting the adjacent ones of said rigid members together proximate said diaphragm and being disposed in tension over said spacer member at points thereon between said slots, said network providing a tensile resistance to axial displacement of said diaphragm while providing for axial displacement between the adjacent ones of said rigid members.

10. A flexible diaphragm in accordance with claim 9 wherein at least one of said spacer members is provided with an annular radially extending plate which is arcuate in cross-section disposed around the end thereof farthest removed from said diaphragm, said plate being disposed so that a line defining the chord length thereof is substantially parallel to said diaphragm, said plate having radially disposed slots therethrough corresponding in disposition to the slots in said spacer member.

11. A flexible diaphragm in accordance with claim 9 wherein at least one of the spacer members thereof is provided with a flat annular plate, said plate being disposed in spaced parallel relation to said diaphragm, said plate being provided with radially disposed slots therethrough corresponding in disposition to the slots in said spacer member.

12. A flexible diaphragm in accordance with claim 9 wherein said spacer members terminate in annular surfaces engageable with said diaphragm, said annular surfaces being arcuate in cross-section around the diaphragm abutting end thereof, said surfaces being disposed so that a line defining the chord length thereof is substantially parallel to said diaphragm.

13. A flexible dipahragm in accordance with claim 9 wherein the network of flexible members on one side of said diaphragm has different mechanical properties than the network of flexible members on the opposite side of said diaphragm.

14. A reinforced flexible diaphragm comprising: a substantially flat diaphragm member; rigid disc members positioned on and fixed to opposite faces of said diaphragm; annular rigid outer members positioned on and fixed to opposite faces of said diaphragm in spaced concentric relationship with said disc members to define, in conjunction with said rigid disc members, annular spaces therebetween; at least one spacer member disposed in each of said spaces in abutting relationship with said diaphragm, said spacer members having a plurality of spaced slots therein extending axially from the end thereof farthest removed from said diaphragm to a point proximate said diaphragm, one of said spacer members being provided with an arcuate plate around the end thereof farthest removed from said diaphragm, said arcuate plate being disposed so that a line defining the chord length thereof is substantially parallel to said dipahragm, said arcuate plate having radially disposed slots therethrough corresponding in disposition to the slots in said spacer member, the other of said spacer members having a flat plate disposed parallel to said diaphragm around the end of said spacer member farthest removed therefrom, said flat plate being provided with radially disposed slots therethrough corresponding in disposition to the slots in said spacer members, each of said spacer members having a reduced annular surface which is arcuate in cross-section around the flange abutting ends thereof, said annular surface being disposed so that a line defining the chord length thereof is substantially parallel to said diaphragm; and a network of elongated flexible members connecting the adjacent of said rigid members together proximate said diaphragm and disposed in tension over said spacer member at points thereon between said slot, said network being further disposed to provide a tensile resistance to axial displacement of said diaphragm while providing for axial displacement between said adjacent rigid members.

References Cited by the Examiner

UNITED STATES PATENTS

| | | | |
|---|---|---|---|
| 9,107 | 7/1852 | Ware | 92—94 |
| 769,050 | 8/1904 | Boekel et al. | 92—99 X |
| 1,034,323 | 7/1912 | Tanner | 92—99 X |
| 1,630,292 | 5/1927 | Ely | 92—99 X |
| 2,492,465 | 12/1949 | Dahl | 92—100 X |

LAVERNE D. GEIGER, *Primary Examiner.*

J. MEDNICK, *Examiner.*